(12) United States Patent
Mishima

(10) Patent No.: US 8,197,369 B2
(45) Date of Patent: Jun. 12, 2012

(54) HYDRAULIC TENSIONER

(75) Inventor: Kunihiko Mishima, Nabari (JP)

(73) Assignee: BorgWarner Inc., Auburn Hills, MI (US)

( * ) Notice: Subject to any disclaimer, the term of this patent is extended or adjusted under 35 U.S.C. 154(b) by 710 days.

(21) Appl. No.: 12/278,607

(22) PCT Filed: Jan. 22, 2007

(86) PCT No.: PCT/JP2007/051326
§ 371 (c)(1),
(2), (4) Date: Aug. 7, 2008

(87) PCT Pub. No.: WO2007/091437
PCT Pub. Date: Aug. 16, 2007

(65) Prior Publication Data
US 2009/0170647 A1   Jul. 2, 2009

(30) Foreign Application Priority Data

Feb. 10, 2006  (JP) .................................. 2006-33785

(51) Int. Cl.
*F16H 7/22* (2006.01)
(52) U.S. Cl. ...................................................... 474/110
(58) Field of Classification Search .................. 474/110, 474/103, 104, 109, 111, 101
See application file for complete search history.

(56) References Cited

U.S. PATENT DOCUMENTS

| | | | | |
|---|---|---|---|---|
| 5,431,602 A | * | 7/1995 | Hendriks et al. | ................. 474/28 |
| 5,538,478 A | * | 7/1996 | Nakakubo et al. | ............. 474/110 |
| 6,196,939 B1 | * | 3/2001 | Simpson | ........................ 474/110 |
| 6,352,487 B1 | | 3/2002 | Tada | |
| 6,899,650 B2 | * | 5/2005 | Okuda et al. | ................... 474/110 |
| 7,070,528 B2 | * | 7/2006 | Emizu et al. | ................... 474/110 |
| 7,699,730 B2 | * | 4/2010 | Emizu et al. | ................... 474/110 |
| 2002/0169042 A1 | | 11/2002 | Kurohata et al. | |
| 2003/0070717 A1 | | 4/2003 | Hashimoto et al. | |

(Continued)

FOREIGN PATENT DOCUMENTS

DE    2008472    9/1971

(Continued)

OTHER PUBLICATIONS

International Search Report and Written Opinion dated Apr. 18, 2007 for PCT/JP2007/051326.

*Primary Examiner* — Juan Campos, Jr.
(74) *Attorney, Agent, or Firm* — Brown & Michaels, PC

(57) ABSTRACT

The present invention is directed to varying the oil pressure in the chamber of a hydraulic tensioner at multi-stages and preventing an increase of the chain friction at various driving conditions. A hydraulic tensioner (1) includes a housing (2) that has a plunger bore (2a) to slidably receive the plunger (3) and a spool bore (2b) to slidably receive the spool (4). The housing (2) further has an inner relief aperture (22) to provide a connection between the plunger bore and the spool bore and outside relief apertures (23a, 23b) to provide a connection between the spool bore and the outside of the housing. The entire opening areas of the inside and outside relief apertures (22, 23a, 23b) provide a connection between the plunger bore and the outside of the housing through the spool bore (2b) and vary at least at two stages in accordance with the travel of the spool (4).

4 Claims, 7 Drawing Sheets

U.S. PATENT DOCUMENTS

2003/0171179 A1* 9/2003 Okuda et al. .................. 474/110
2003/0216202 A1* 11/2003 Emizu et al. .................. 474/109
2006/0063625 A1* 3/2006 Emizu et al. .................. 474/110

FOREIGN PATENT DOCUMENTS

| | | |
|---|---|---|
| EP | 329855 A1 * | 8/1989 |
| EP | 1001185 | 5/2000 |
| EP | 1258655 | 11/2002 |
| EP | 1302698 | 4/2003 |
| JP | 9303506 | 11/1997 |
| JP | 200121013 | 1/2001 |
| JP | 2002054700 A | 2/2002 |
| JP | 2005282672 A | 10/2005 |

* cited by examiner

HYDRAULIC TENSIONER

TECHNICAL FIELD

The present invention relates to a hydraulic tensioner having a pressure relief valve that can vary the hydraulic pressure of the chamber at multi-stages.

BACKGROUND ART

Generally, in timing chains in use for driving valve actuating devices for internal combustion engines, cam shaft chains for drivingly connecting the cam shafts, and balancer chains, hydraulic tensioners have been used on the slack sides of the chains in order to take up slacks of the chains that occur during operation of the chains and to generate tension in the chains.

A hydraulic tensioner of prior art typically includes a housing, and a plunger that is slidably received in the plunger bore formed in the housing. Oil pressure from the external source of pressurized fluid is supplied to the hydraulic chamber that is defined by the inner wall surfaces of the piston bore and the rear end surface of the piston.

In such a hydraulic tensioner, when the tension in the chain has increased due to resonance of a chain span and the chain imparts an excessive force to the plunger, oil pressure in the hydraulic chamber increases and an excessive reaction force acts upon the chain from the plunger. As a result, friction of the chain may increase.

Therefore, a hydraulic tensioner having a pressure relief valve has been proposed such that when the pressure in the hydraulic chamber has exceeded the predetermined level oil in the oil chamber is allowed to exit the oil chamber to restrain an increase in the pressure of the hydraulic chamber.

Hydraulic tensioners having pressure relief valves of prior art are shown in Japanese patent application publication Nos. 9-303506 and 2001-21013 (hereinafter referred to JP reference Nos. 9-303506 and 2001-21013, respectively). JP reference No. 9-303506 describes a disk-shaped pressure relief valve to open and close the oil passage formed at the distal end of the plunger. The stepped portion of the oil passage has a seat formed thereon and the pressure relief valve is biased against the seat, i.e. toward closure of the oil passage, by the elastic resilient force of the spring provided in the oil passage. JP reference No. 2001-21013 describes a ball as a pressure relief valve openably and closably operatable in the aperture of the valve housing. The aperture has a seat formed thereon and the ball is biased against the seat, i.e. toward closure of the aperture, by the elastic resilient force of the spring provided in the valve housing.

In such a hydraulic tensioner with a pressure relief valve, when the pressure in the hydraulic chamber has exceeded the predetermined level, the pressure relief valve leaves the seat against the force of the spring, thereby opening the pressure relief valve to discharge oil in the hydraulic chamber to the outside of the tensioner. As a result of this, oil pressure in the hydraulic chamber can be regulated.

However, the prior-art hydraulic tensioner is constructed such that the pressure relief valve opens only when the pressure in the hydraulic chamber has exceeded the predetermined level and it is thus difficult to correspond to the various operating conditions of the engine.

For example, in the case of a tensioner where a relatively high oil pressure is supplied in order to control chain motions at idle of the engine, pressure in the hydraulic chamber becomes higher than the expected value at the normal operating conditions of the engine and chain frictions thus increase. In order to solve such problem, the relief valve is set to open only at the normal operating conditions. However, in this case, at the time of resonance of a chain span, pressure relief of the hydraulic chamber cannot be fully carried out, thus causing a problem of an increase of chain friction due to excessive tension of the chain span.

Also, in the case of a tensioner where a relief valve is set to open only at the time of resonance of a chain span, pressure of the hydraulic chamber cannot be maintained at an appropriate value both at idle and at normal operating conditions. Similarly, a problem of an increase of chain friction occurs.

An increase of chain friction incurs a decrease of fuel efficiency of an engine, which is contrary to the demand for improved fuel efficiency in the automotive industry that has reflected recent environmental issues.

The present invention has been made in view of the above-mentioned circumstances, and its object is to prevent an increase of the chain friction in the various engine operating conditions by varying at multi-stages the oil pressure in the hydraulic chamber of a hydraulic tensioner having a pressure relief valve.

DISCLOSURE OF INVENTION

A hydraulic tensioner having a pressure relief valve mechanism according to the present invention includes a plunger for pressing against a chain, a housing that has a plunger bore to slidably support the plunger and that has a spool bore adapted to communicate with the plunger bore and the outside of the housing, and a spool that is slidably supported in the spool bore. The housing has an inner relief aperture to provide a connection between the plunger bore and the spool bore and an outer relief aperture to provide a connection between the spool bore and the outside of the housing. At least one of the inner relief aperture or the outer relief aperture is provided in plural numbers. The entire opening areas of the inner and outer relief apertures that provide a connection between the plunger bore and the outside of the housing through the spool bore are adapted to vary at least at two stages in accordance with the travel of the spool.

According to the present invention, as above-mentioned, since the entire opening areas of the inner and outer relief apertures providing a connection between the plunger bore and the outside of the housing vary at least at two stages in accordance with the travel of the spool, oil pressure in the hydraulic chamber formed between the plunger and the plunger bore can be changed at least at two stages. Thereby, under various engine operating conditions, force from the plunger to the chain can be regulated and an increase in chain friction can thus be prevented.

A single inner relief aperture and two outer relief apertures may be provided. In this case, at idle of the engine, both the inner and outer relief apertures are closed by the spool. During the normal operation of the engine, the inner relief aperture and one of the outer relief apertures are open. At an engine rotational speed causing resonance of the chain, both the inner relief aperture and the two outer relief apertures are open.

In such a way, since both the inner and outer relief apertures are closed by the spool at idle, oil pressure in the hydraulic chamber can be maintained at a relatively high state. Therefore, by supplying high pressure oil into the hydraulic chamber at idle, the plunger can be securely pressed against the chain and noise due to chattering of the plunger can thus be prevented from occurring. Also, since the inner relief aperture and one of the outer relief apertures are open during normal operation, oil pressure in the hydraulic chamber can be maintained at a level lower than the oil pressure at idle. Thereby, chain friction can be decreased during normal operation. Further, since both the two outer relief apertures and the inner relief aperture are open during engine operation causing chain resonance, oil pressure in the hydraulic chamber can be maintained at a level lower than the oil pressure at the normal operation. Thereby, chain friction can be decreased during chain resonance.

The spool may include at least two lands each of which has essentially the same outer diameter as the inner diameter of the spool bore. A small diameter portion that has a diameter smaller than the diameter of each of the lands is formed between the adjacent lands.

In this case, the lands of the spool act to close the inner relief aperture or the outer relief aperture and the small diameter portion between the adjacent lands of the spool act to open the inner relief aperture or the outer relief aperture.

The land of the spool may have a tapered portion between the land and the small diameter portion.

In this case, the amount of oil discharged from the tensioner during travel of the spool will not be increased abruptly by the difference in level between the land and the small diameter portion of the spool. In contrast, the tapered portion between the land and the small diameter portion of the spool allows the amount of oil discharged from the tensioner to vary smoothly.

An oil inlet may be provided in the spool bore to introduce oil to provide a hydraulic pressure to an end of the spool.

A solenoid may be provided in the spool bore to provide a press against an end of the spool.

BEST MODE FOR CARRYING OUT THE INVENTION

Figure 1:
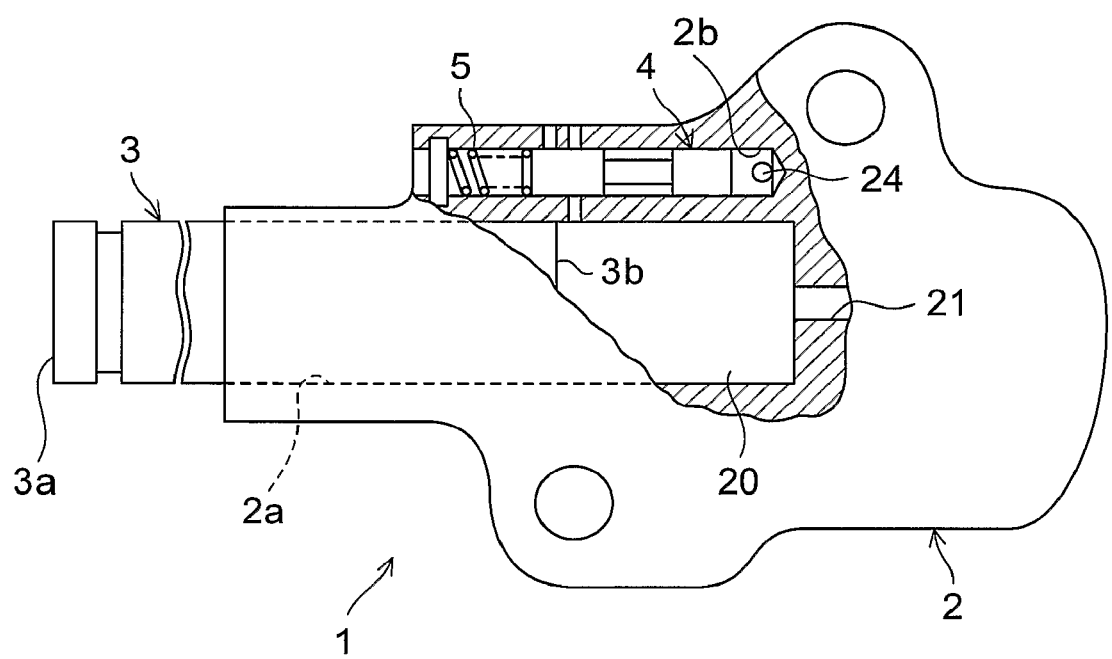
FIG. 1 is a partially sectioned side view of a hydraulic tensioner according to a first embodiment of the present invention.

FIGS. 1 to 5 show a hydraulic tensioner according to a first embodiment of the present invention. As shown in FIG. 1, a hydraulic tensioner 1 includes a housing 2, a plunger 3 slidably received in a plunger bore 2a that is formed in the housing 2, and that extends in the axial direction to an opening end, and a spool 4 slidably received in a spool bore 2b that is formed in the housing 2.

In the plunger bore 2a, a hydraulic chamber 20 is defined by the inner wall surface of the plunger bore 2a and the rear end surface 3b of the plunger 3. An oil passage 21 is formed in the housing 2 to introduce oil pressure from the source of pressurized oil (e.g. oil pump, not shown) into the hydraulic chamber 20. The distal end surface 3a of the plunger 3 is adapted to exert a press onto the chain (not shown) via a tensioner arm (also not shown). In the example shown in FIG. 1, the spool bore 2b extends parallel to the plunger bore 2a.

Figure 2:
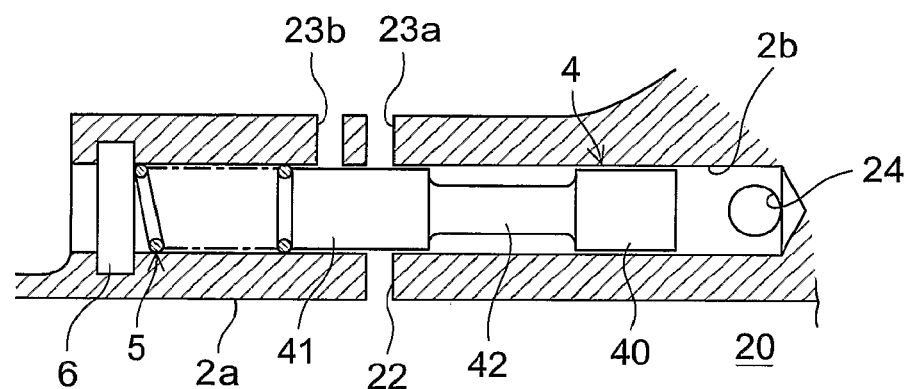
FIG. 2 is an enlarged view of a spool valve of the hydraulic tensioner of FIG. 1.

As shown in FIG. 2, the housing 2 has an inner relief aperture 22 in connection with the plunger bore 2a and the spool bore 2b and two outer relief apertures 23a, 23b in connection with the spool bore 2b and the outside of the housing 2. Through the inner relief aperture 22 and the outer relief apertures 23a, 23b, the hydraulic chamber 20 can be in communication with the outside of the housing 2. In other words, the spool bore 2b can provide a connection between the plunger bore 2a and the outside of the housing 2.

The spool bore 2b slidably receives the spool 4. The spool 4 has at least two lands 40, 41 of the essentially same outer diameter as the inner diameter of the spool bore 2b. Between the adjacent lands 40 and 41, a small diameter portion 42 having the outer diameter smaller than the outer diameter of the lands 40, 41 is provided. An oil inlet 24 is provided at an end of the spool bore 2b to introduce oil from the source of pressurized oil (e.g. oil pump, not shown) into the spool bore 2b to exert oil pressure onto the land 40 of the spool 4. A spring 5 is provided at the other end of the spool bore 2b to exert a resilient force to the land 41 of the spool 4. An end of the spring 5 presses against the land 41. The other end of the spring 5 presses against a block member 6 fixedly fitted to the spool bore 2b. In such a manner, a pressure relief valve mechanism is constructed.

During operation of the engine, pressurized oil supplied from the oil pump is introduced through the oil passage 21 into the hydraulic chamber 20 and also through the oil inlet 24 into the spool bore 2b.

At idle of the engine, as shown in FIG. 2, the land 41 of the spool 4 acts to close both the inner relief aperture 22 and the outer relief apertures 23a, 23b. Therefore, oil in the hydraulic chamber 20 will not be discharged to the outside of the housing 2 through the spool bore 2b. Also, at this juncture, at the spool position shown in FIG. 2, a press due to the hydraulic pressure of the pressurized oil that has been supplied from the oil pump through the oil inlet 24 into the spool bore 2b acts upon the land 40 of the spool 4. The press is balanced by the resilient force of the spring 5 imparted onto the land 41 of the spool 4.

Figure 4:
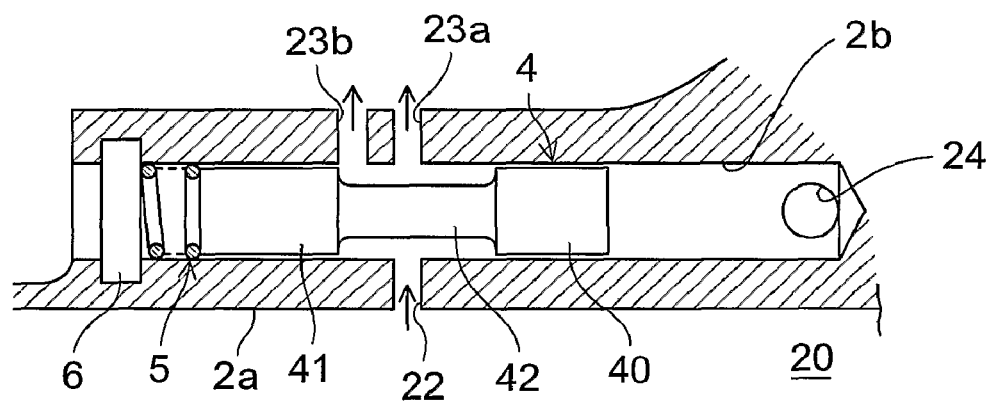
FIG. 4 illustrates operation of the spool valve of the hydraulic tensioner of FIG. 1.
Figure 5:
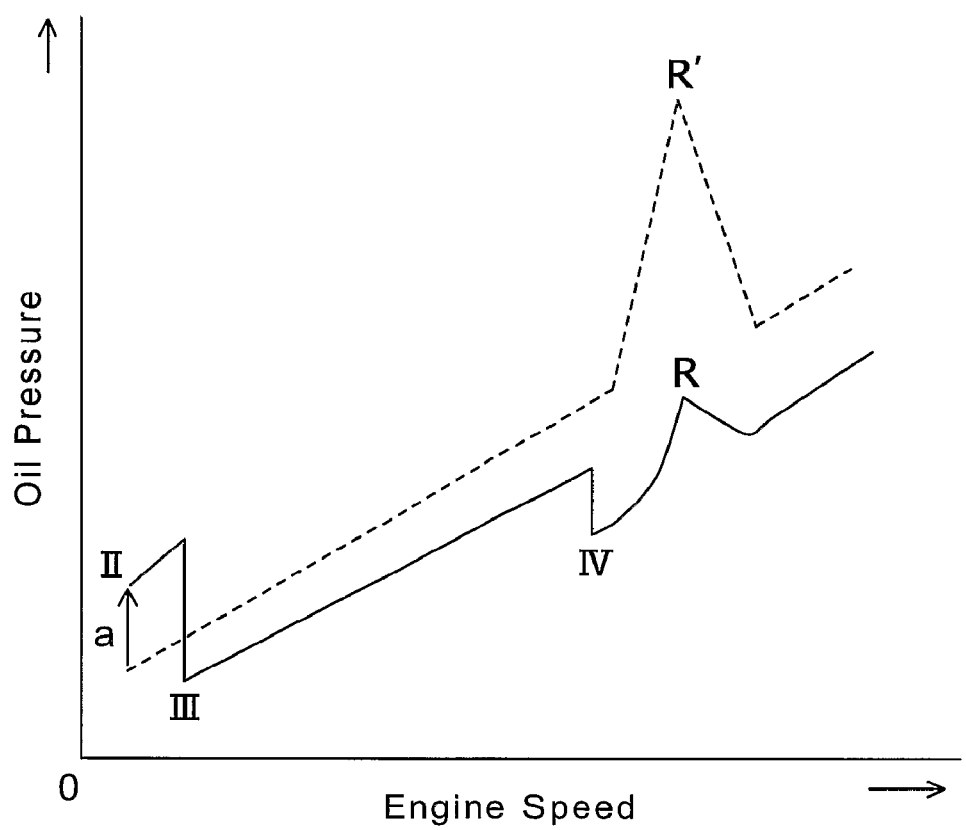
FIG. 5 is a graph illustrating correlation between the oil pressure of the pressurized oil of the hydraulic tensioner of FIG. 1 and the engine speed, also illustrating correlation in the case of a prior-art hydraulic tensioner.

Here, FIG. 5 shows a correlation between the oil pressure of the pressurized oil of the hydraulic tensioner and the engine speed. In FIG. 5, a solid line indicates the case of the hydraulic tensioner of the present invention, and a broken line indicates the case of a prior-art hydraulic tensioner. Also, in FIG. 5, Stages II, III and IV correspond to the states of FIGS. 2, 3 and 4, respectively. Points R, R' indicate the state of resonance of a chain span.

As shown in Stage II of FIG. 5, at idle of the engine, the oil pressure of the pressurized oil is set at a value higher than the oil pressure of the prior-art hydraulic tensioner (see arrow mark a in the drawing). Thereby, at idle of the engine, a relatively high oil pressure in the hydraulic chamber helps the plunger to press against the chain firmly. As a result, noise due to chattering of the plunger can be prevented from occurring. In such a manner, chain behaviors at idle can be easily controlled.

Figure 3:
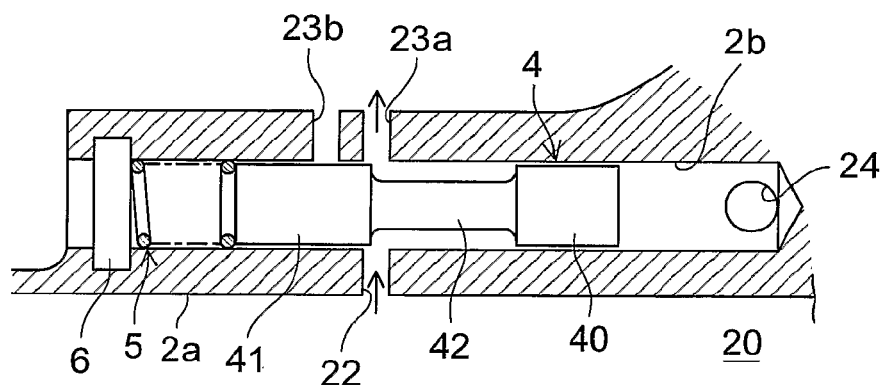
FIG. 3 illustrates operation of the spool valve of the hydraulic tensioner of FIG. 1.

Then, during normal operation of the engine, as shown in FIG. 3, the spool 4 moves to the left of the drawing with an increase of the oil pressure of the pressurized oil. The land 41 of the spool 4 acts to open the inner relief aperture 22 and the outer relief aperture 23a of the two relief apertures. As a result, oil in the hydraulic chamber 20 is discharged through the inner relief aperture 22, spool bore 2b, and outer relief aperture 23a to the outside of the housing 2. Also, at this juncture, at the spool position shown in FIG. 3, a press onto the land 40 due to the pressurized oil in the spool bore 2b is balanced by the resilient force of the spring 5 imparted onto the land 41 of the spool 4.

During the normal operation, oil in the hydraulic chamber 20 is discharged from the inner relief aperture 22 through the outer relief aperture 23a to the outside of the housing. As a result, as shown in Stage III of FIG. 5, oil pressure in the hydraulic chamber decreases below the oil pressure at idle. Thereby, chain friction can be prevented from increasing during normal operation of the engine.

In addition, at the region of the normal operation, a gradual increase of the oil pressure of the pressurized oil from the oil pump with the increase of the engine speed is shown in Stage III to IV in FIG. 5.

Next, when the engine speed has reached the engine rotational speed causing resonance of the chain span, the spool 4 moves further to the left of the drawing, as shown in FIG. 4. The land 41 of the spool 4 acts to open the inner relief aperture 22 and the outer relief apertures 23a, 23b. Thereby, oil in the hydraulic chamber 20 is discharged through the inner relief aperture 22, spool bore 2b, and outer relief aperture 23a, 23b to the outside of the housing 2. Also, at this juncture, at the spool position shown in FIG. 4, a press onto the land 40 due to the pressurized oil in the spool bore 2b is balanced by the resilient force of the spring 5 imparted onto the land 41 of the spool 4.

At the chain resonance region of the engine rotational speed, oil in the hydraulic chamber 20 is discharged from the inner relief aperture 22 through the outer relief apertures 23a, 23b to the outside of the housing. As a result, as shown in Stage IV of FIG. 5, oil pressure in the hydraulic chamber decreases below the oil pressure immediately before the chain resonance. Thereby, chain friction can be prevented from increasing during the chain resonance region of the engine rotational speed.

According to the first embodiment of the present invention, the entire opening areas of the inner relief aperture 22 and the outer relief apertures 23a, 23b providing a connection between the plunger bore 2a and the outside of the housing 2 through the spool bore 2b vary at two stages, i.e. at normal operation and chain resonance, in accordance with the travel of the spool 4. Thereby, oil pressure in the hydraulic chamber 20 can be changed at two stages. As a result, under the various engine operating conditions, force from the plunger 3 to the chain can be regulated and an increase in chain friction can thus be prevented.

Figure 6:
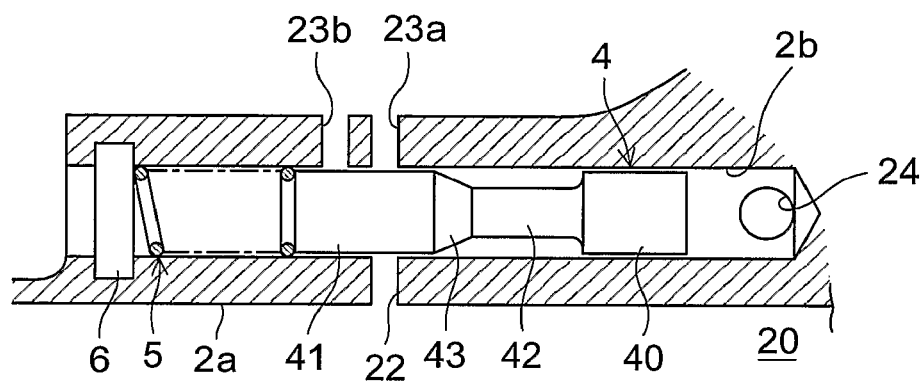
FIG. 6 is an enlarged view of a spool valve of a hydraulic tensioner according to a second embodiment of the present invention.
Figure 7:
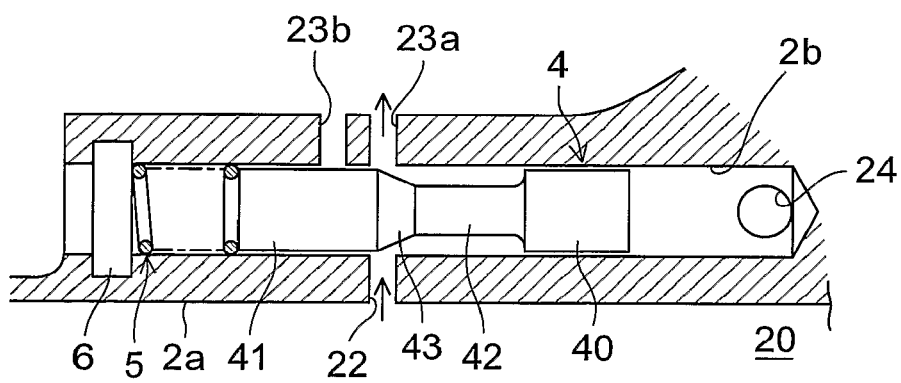
FIG. 7 illustrates operation of the spool valve of the hydraulic tensioner of FIG. 6.

FIGS. 6 to 7 show a hydraulic tensioner according to a second embodiment of the present invention. In these drawings, like reference numbers indicate identical or functionally similar elements. The second embodiment differs from the first embodiment in that a tapered portion 43 is provided between the land 41 and the small diameter portion 42 of the spool 4.

At idle of the engine, as shown in FIG. 6, the land 41 of the spool 4 acts to close both the inner relief aperture 22 and the outer relief apertures 23a, 23b. Therefore, oil in the hydraulic chamber 20 will not be discharged to the outside of the housing 2 through the spool bore 2b. In this case, as with the first embodiment, a relatively high oil pressure supplied into the hydraulic chamber 20 helps the plunger 20 to press against the chain firmly. As a result, noise due to chattering of the plunger 20 can be prevented from occurring and chain behaviors at idle can be easily controlled.

During normal operation of the engine, as shown in FIG. 7, the spool 4 moves to the left of the drawing with an increase of the oil pressure of the pressurized oil. The tapered portion 43 of the spool 4 is disposed opposite the inner relief aperture 22 and the outer relief aperture 23a so as to act to open a portion of the inner and outer relief apertures 22, 23a. As a result, oil in the hydraulic chamber 20 is discharged through the inner relief aperture 22, spool bore 2b, and outer relief aperture 23a to the outside of the housing 2. Thereby, oil pressure in the hydraulic chamber 20 decreases below the oil pressure at idle. Chain friction can thus be prevented from increasing during normal operation of the engine.

Moreover, in this case, since the tapered portion 43 of the spool 4 is disposed at the opening portions of the inner and outer relief apertures 22, 23a, the amount of oil discharged from the hydraulic chamber 20 through the inner and outer relief apertures 22, 23a to the outside of the housing 2 can be regulated, thereby restraining the oil pressure in the hydraulic chamber 20 from decreasing abruptly.

Each of the above-mentioned first and second embodiments shows an example in which only the outer relief aperture is provided in plural numbers (in this case, two), but the present invention is not limited to such an example. Only the inner relief aperture may be provided in plural numbers. Alternatively, as shown in FIGS. 8 to 11, both the inner and outer relief apertures may be provided in plural numbers (in this case, two, respectively).

Figure 8:
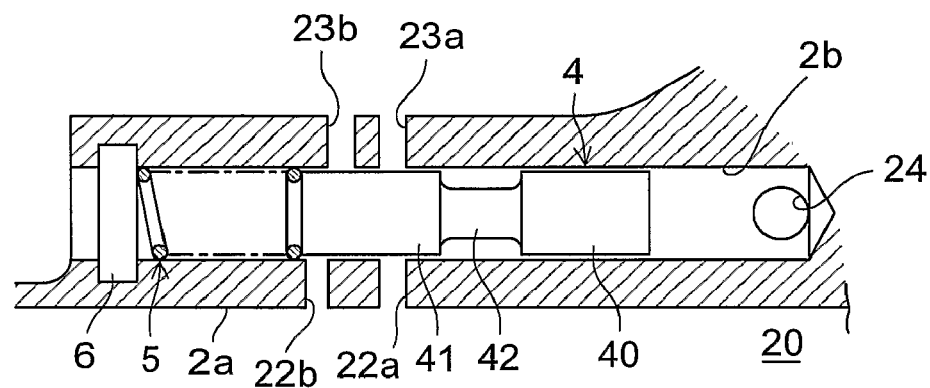
FIG. 8 is an enlarged view of a spool valve of a hydraulic tensioner according to a third embodiment of the present invention.
Figure 9:
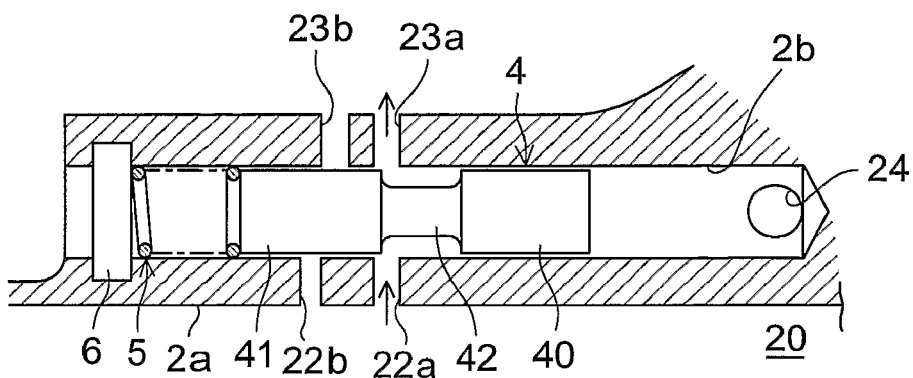
FIG. 9 illustrates operation of the spool valve of the hydraulic tensioner of FIG. 8.
Figure 10:
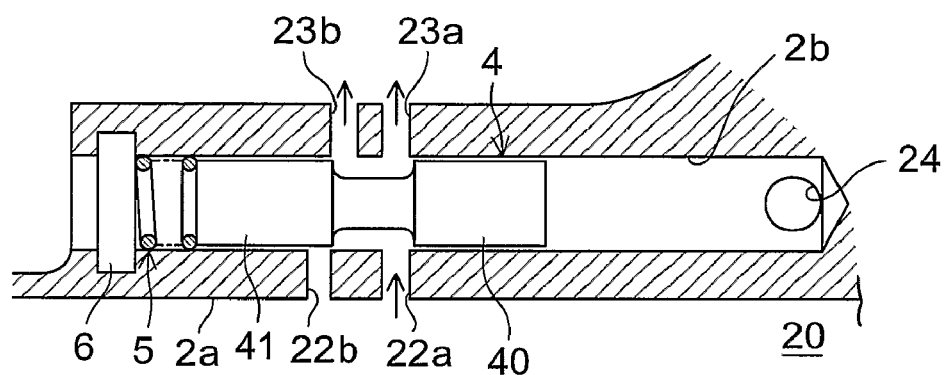
FIG. 10 illustrates operation of the spool valve of the hydraulic tensioner of FIG. 8.
Figure 11:
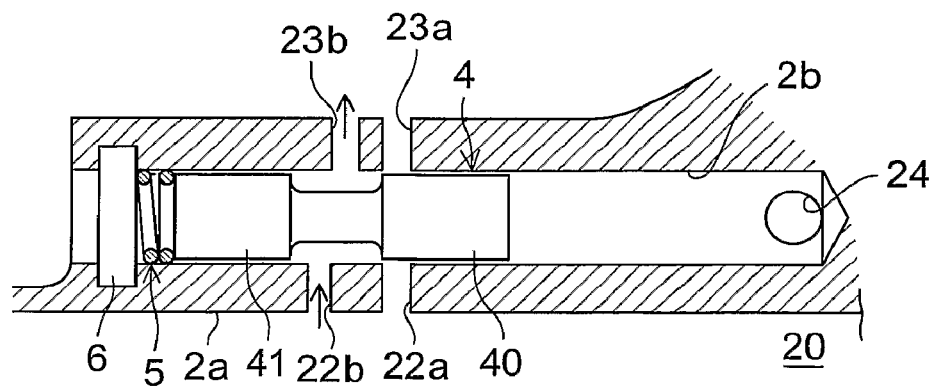
FIG. 11 illustrates operation of the spool valve of the hydraulic tensioner of FIG. 8.

FIGS. 8 to 11 show a hydraulic tensioner according to a third embodiment of the present invention. In these drawings, like reference numbers indicate identical or functionally similar elements. FIGS. 8, 9 and 10 correspond to FIGS. 2, 3 and 4 of the first embodiment, respectively. FIG. 11 shows the features of the third embodiment.

This third embodiment differs from the above-mentioned first and second embodiments in that two inner relief apertures are provided. That is, in FIGS. 8 to 11, an inner relief aperture 22a corresponds to the inner relief aperture 22 of the first and second embodiments and an inner relief aperture 22b is newly provided in the third embodiment.

In FIGS. 8, 9, and 10 that respectively illustrate the state of idle, normal, and resonance operations of the engine, the inner relief aperture 22b is closed at all times by the land 41 of the spool 4. Therefore, the motions of the spool valve of each of these states are similar to FIGS. 2, 3 and 4 of the first embodiment and detailed explanations are omitted here.

When the oil pressure has further increased from the state of chain resonance shown in FIG. 10 the spool 4 moves further to the left in the drawing of FIG. 11. Then, the inner relief aperture 22a and the outer relief aperture 23a are closed by the land 40 of the spool 4 and at the same time the inner relief aperture 22b is opened.

Thereby, oil in the hydraulic chamber 20 is discharged through the inner relief aperture 22b, spool bore 2b and outer relief aperture 23b to the outside of the housing. In this case, since the amount of oil discharged from the hydraulic chamber 20 decreases as compared with that at resonance, oil pressure in the hydraulic chamber 20 can be maintained at a relatively high pressure. As a result, lateral oscillation of a chain can be securely prevented at a high speed region of the engine.

In the above-mentioned embodiments, the oil inlet 24 is formed at an end of the spool bore 2b in order to exert hydraulic pressure on an end of the spool 4. In lieu of the oil inlet 24, a solenoid, preferably variable force solenoid (VFS), may be provided to exert a mechanical force from a plunger of the solenoid to an end of the spool 4.

INDUSTRIAL APPLICABILITY

A hydraulic tensioner according to the present invention is useful for automotive industry. Because the hydraulic tensioner can provide a decrease in chain friction to improve fuel efficiency.

The invention claimed is:

1. A hydraulic tensioner having a pressure relief valve mechanism for an engine having engine stages, including at least an idle stage, normal operation stage, and chain resonance stage, the tensioner comprising:
   a plunger for pressing against a chain;
   a housing that has a plunger bore to slidably receive the plunger and that has a spool bore having at least one inner relief aperture in communication with the plunger bore and at least two outer relief apertures connecting the spool bore to an outside of the housing;
   a hydraulic chamber formed between the plunger bore and the plunger having an inlet for receiving fluid from a source of pressurized oil; and
   a spool valve comprising a spool that is slidably supported in the spool bore, the spool being moveable within the spool bore by oil pressure from the source of pressurized oil through the inlet, between at least three positions corresponding to the idle stage, the normal operation stage, and the chain resonance stage of the engine;
   wherein when the spool is in the position corresponding to the idle stage, the spool blocks fluid flow from the at least one inner relief apertures to the at least two outer relief apertures;
   wherein when the spool is in the position corresponding to the normal operation stage, one of the at least two outer relief apertures is in fluid communication with the at least one inner relief aperture through the spool bore, connecting the plunger bore to the outside of the housing; and
   wherein when the spool is in the position corresponding to the chain resonance stage, at least two outer relief apertures are in fluid communication with at least one inner relief aperture through the spool bore, connecting the plunger bore to the outside of the housing.

2. The hydraulic tensioner of claim 1, in which there are at least two of said inner relief apertures, and when the spool is in the position corresponding to the chain resonance stage, at least two outer relief apertures are in fluid communication with at least one of said inner relief apertures through the spool bore.

3. The hydraulic tensioner of claim 1, wherein the spool comprises at least two lands each having essentially the same outer diameter as the inner diameter of the spool bore, and a small diameter portion having a diameter smaller than the diameter of each of the lands, being formed between the two lands.

4. The hydraulic tensioner of claim 3, wherein at least one of the two lands of the spool has a tapered portion between the land and the small diameter portion.

* * * * *

UNITED STATES PATENT AND TRADEMARK OFFICE
CERTIFICATE OF CORRECTION

| | | |
|---|---|---|
| PATENT NO. | : 8,197,369 B2 | Page 1 of 1 |
| APPLICATION NO. | : 12/278607 | |
| DATED | : June 12, 2012 | |
| INVENTOR(S) | : Kunihiko Mishima | |

It is certified that error appears in the above-identified patent and that said Letters Patent is hereby corrected as shown below:

Title Page, Item (73) Assignee: should read -- BorgWarner Morse TEC Japan K.K., Nabari-shi, Mie, JP --

Signed and Sealed this
Sixth Day of November, 2012

David J. Kappos
*Director of the United States Patent and Trademark Office*